US006501441B1

(12) United States Patent
Ludtke et al.

(10) Patent No.: US 6,501,441 B1
(45) Date of Patent: Dec. 31, 2002

(54) METHOD OF AND APPARATUS FOR PARTITIONING, SCALING AND DISPLAYING VIDEO AND/OR GRAPHICS ACROSS SEVERAL DISPLAY DEVICES

(75) Inventors: Harold Aaron Ludtke, San Jose, CA (US); Scott D. Smyers, San Jose, CA (US); Mark Kenneth Eyer, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/336,489

(22) Filed: Jun. 18, 1999

Related U.S. Application Data

(63) Continuation-in-part of application No. 09/251,586, filed on Feb. 17, 1999.
(60) Provisional application No. 60/089,798, filed on Jun. 18, 1998, and provisional application No. 60/129,008, filed on Apr. 13, 1999.

(51) Int. Cl.[7] .......................... G09G 5/00; G06F 15/00
(52) U.S. Cl. .................. 345/1.1; 345/1.2; 345/1.3; 345/205; 345/660; 345/723; 345/800; 348/383; 348/840
(58) Field of Search ........................ 345/1, 503, 2, 345/504, 3, 520, 4, 543, 660, 544, 903, 547, 671, 548, 565, 699, 670, 686, 687, 723, 726, 730, 788, 764–767, 792, 798, 800–807, 815, 838, 505–506, 530–535, 902, 905, 555, 556, 561, 571, 204, 205, 213, 214, 1.1, 1.2, 1.3, 2.2, 3.1–3.4, 5, 10, 29–30, 33; 348/13, 14, 15, 16, 383, 840; 340/716, 721; 358/56, 241, 87

(56) References Cited

U.S. PATENT DOCUMENTS 4,290,064 A 9/1981 Traster ...................... 340/723

(List continued on next page.)

FOREIGN PATENT DOCUMENTS

EP 0 476 533 A2 3/1992 .......... G06F/15/72

(List continued on next page.)

OTHER PUBLICATIONS

Teener, M., "A Bus on a Diet–The Serial Alternative: An Introduction to the P1394 High Performance Serial Bus," Apple Computer, Inc., Santa Clara, Document No. XP 000340753, pp. 316–321, IEEE, 1992.

(List continued on next page.)

*Primary Examiner*—Matthew Luu
*Assistant Examiner*—Wesner Sajous
(74) *Attorney, Agent, or Firm*—Haverstock & Owens LLP

(57) ABSTRACT

An apparatus for partitioning, scaling and displaying video and/or graphics across several display devices includes a video source, a master device and multiple display devices arranged into a multiple display configuration. Preferably, the master device partitions the video stream into image sections and assigns each display device a corresponding image section based on its position within the multiple display configuration. Each display device then preferably receives the video stream and separates the data representing the corresponding image section. Preferably, once the data for the corresponding image section is separated, the display devices then scale their respective image sections to a full screen size image and display the scaled image simultaneously with the display of the entire frame on all display devices within the multiple display configuration. In an alternative embodiment, the master device is responsible for partitioning the video stream into image sections, scaling the image sections, encoding the scaled image sections and transmitting the scaled and encoded image sections to the appropriate display devices within the multiple display configuration. The display devices then simultaneously display the image at an appropriate time based on information in the video stream or as specified by the master device. This process is repeated for each frame within the video stream. In a further alternate embodiment, the multiple display configuration includes a combination of display devices capable of physically partitioning an image section from the video stream and display devices to which the master device partitions, scales, encodes and transmits the image for display.

45 Claims, 9 Drawing Sheets

U.S. PATENT DOCUMENTS

| | | | | |
|---|---|---|---|---|
| 4,800,376 A | * | 1/1989 | Suga | 340/721 |
| 4,951,037 A | | 8/1990 | Goossen | 340/715 |
| 5,003,496 A | | 3/1991 | Hunt, Jr. et al. | 364/521 |
| 5,255,360 A | | 10/1993 | Peaslee et al. | 395/162 |
| 5,262,965 A | | 11/1993 | Putnam et al. | 395/101 |
| 5,343,250 A | * | 8/1994 | Iwamura | 348/564 |
| 5,436,618 A | | 7/1995 | Van Steenbrugge | 340/825.25 |
| 5,436,641 A | | 7/1995 | Hoang et al. | 345/197 |
| 5,444,709 A | | 8/1995 | Riddle | 370/94.1 |
| 5,477,262 A | | 12/1995 | Banker et al. | 348/7 |
| 5,541,982 A | | 7/1996 | Bergler | 379/93 |
| 5,558,339 A | | 9/1996 | Perlman | 463/42 |
| 5,561,670 A | | 10/1996 | Hoffert et al. | 370/94.1 |
| 5,581,796 A | | 12/1996 | Koga et al. | 395/133 |
| 5,586,257 A | | 12/1996 | Perlman | 463/42 |
| 5,596,581 A | | 1/1997 | Saeijs et al. | 370/394 |
| 5,610,665 A | | 3/1997 | Berman | 348/564 |
| 5,625,405 A | | 4/1997 | DuLac et al. | 348/7 |
| 5,640,392 A | | 6/1997 | Hayashi | 370/395 |
| 5,642,498 A | * | 6/1997 | Kutner | 395/509 |
| 5,682,249 A | * | 10/1997 | Harrington | 358/433 |
| 5,692,211 A | | 11/1997 | Gulick et al. | 395/800 |
| 5,708,527 A | * | 1/1998 | Adamson | 395/451 |
| 5,729,704 A | | 3/1998 | Stone et al. | 395/346 |
| 5,736,944 A | | 4/1998 | Kurihara | 341/50 |
| 5,764,277 A | * | 6/1998 | Loui | 348/14 |
| 5,774,467 A | | 6/1998 | Herrera Van Der Nood et al. | 370/428 |
| 5,778,054 A | * | 7/1998 | Kimura | 379/93.23 |
| 5,870,523 A | | 2/1999 | Kikuchi et al. | 386/95 |
| 5,880,739 A | | 3/1999 | Collins | 345/433 |
| 5,880,777 A | * | 3/1999 | Savoye et al. | 348/217 |
| 5,883,634 A | | 3/1999 | Narayanaswami | 345/434 |
| 5,886,995 A | | 3/1999 | Arsenault et al. | 370/477 |
| 5,909,244 A | * | 6/1999 | Waxman et al. | 348/222 |
| 5,926,153 A | * | 7/1999 | Ohishi | 345/1 |
| 5,948,136 A | | 9/1999 | Smyers | 71/107 |
| 5,966,136 A | | 10/1999 | Kurtz et al. | 345/434 |
| 5,983,190 A | | 11/1999 | Trower, II et al. | 704/276 |
| 5,983,301 A | | 11/1999 | Baker et al. | 710/113 |
| 5,986,622 A | * | 11/1999 | Ong | 345/1 |
| 6,002,401 A | | 12/1999 | Baker | 345/349 |
| 6,003,065 A | | 12/1999 | Yan et al. | 709/201 |
| 6,005,574 A | | 12/1999 | Herrod | 345/344 |
| 6,032,197 A | | 2/2000 | Birdwell et al. | 709/247 |
| 6,069,606 A | * | 5/2000 | Sciammarella | 345/127 |
| 6,084,553 A | * | 7/2000 | Walls | 345/903 |
| 6,111,589 A | | 8/2000 | De Haan | 345/473 |
| 6,115,392 A | | 9/2000 | Nomura | 370/466 |
| 6,121,981 A | | 9/2000 | Trower, II et al. | 345/473 |
| 6,175,386 B1 | | 1/2001 | Van De Schaar-Mitrea et al. | 348/563 |
| 6,208,319 B1 | * | 3/2001 | Nishida | 345/1 |
| 6,243,772 B1 | | 6/2001 | Ghori et al. | 710/68 |

FOREIGN PATENT DOCUMENTS

| | | | | |
|---|---|---|---|---|
| EP | 543414 A2 | * | 11/1992 | G06F/15/401 |
| EP | 0 658 010 A1 | | 6/1995 | H04B/1/20 |
| EP | 0 789 502 A2 | | 2/1997 | H04Q/11/04 |
| EP | 0 840 512 A2 | | 11/1997 | H04N/7/24 |
| EP | 0 835 029 A2 | | 4/1998 | H04N/7/24 |
| WO | 97/49057 | | 12/1997 | |
| WO | 98/25402 | | 6/1998 | H04N/5/222 |

OTHER PUBLICATIONS

Bloks, R.H.J., "The IEEE-1394 High Speed Serial Bus," Document No. XP 000627671, Philips Journal of Research, pp. 209–216, vol. 50, No. 1/2, 1996.

Meirsman, D., "AV/C Audio Control Definition: Draft Proposal For Control of Audio Functionality," Ver. 0.6, Mar. 8, 1998.

Poynton, C., "YUV and Luminance Considered Harmful: A Plea for Precise Terminology in Video," May 2, 1998.

"HDND 1394 Interface Specification [To Be Incorporated into OCI–C1, Consumer Device Interface Specification]," Working paper draft specification ver. 2.2, Cable Television Laboratories, Inc. 1998.

Azhar, S., "Draft EIA–775, DTV 1394 Interface Specification," CEMA, Nov. 30, 1998.

"R4.1 DTV Digital Interference Standard: Draft EIA754," draft 0.30, CEMA/EIA R4.1 Application Working Group, Apr. 8, 1998.

"Push vs. Pull Miscellaneous Notes and TCE Opinion," Thomson Multimedia, Aug. 20, 1998.

"OSD Bitmab Transport over the DTV 1394 Interface; Proposal to CEMA R4.8," Ver. 0.90, Mitsubishi Electric America, Inc., Aug. 26, 1998.

Sony et al., "The HAVi Architecture," Draft Version 0.8n13, Sep. 16, 1998.

Kunzman, et al., "1394 High Performance Serial Bus: The Digital Interface for ATV," IEEE Transactions on Consumer Electronics, Aug., New York, 1995.

"The Parallel Protocol Engine" Matthias Kaiserswerth, IEEE/ACM Transactions on Networking, pp. 650–663, New York, Dec., 1993.

"Digital Interface For Consumer Audio/Video Equipment—Part 5: SDL–DVCR Data Transmission," International Electrotechnical Commission, Project No. 61883–5/FDIS, Feb. 1, 1997.

Patent Abstracts of Japan Publications No. 05094162.

"P1394 Standard for a High Performance Serial Bus," Draft 8.0v2, The Institute of Electrical and Electronic Engineers, Inc., Jul. 7, 1995.

* cited by examiner

METHOD OF AND APPARATUS FOR PARTITIONING, SCALING AND DISPLAYING VIDEO AND/OR GRAPHICS ACROSS SEVERAL DISPLAY DEVICES

RELATED APPLICATIONS:

This application claims priority under 35 U.S.C. §119(e) of the co-pending U.S. provisional applications Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK," and Ser. No. 60/129,008 filed on Apr. 13, 1999 and entitled "A METHOD AND APPARATUS FOR SPLITTING A VIDEO STREAM INTO SEVERAL DISCRETE VIDEO STREAMS FOR ARTIFICIALLY MAGNIFYING THE DISPLAY ACROSS SEVERAL DISPLAY DEVICES." The provisional applications Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK," and Ser. No. 60/129,008 filed on Apr. 13, 1999 and entitled "A METHOD AND APPARATUS FOR SPLITTING A VIDEO STREAM INTO SEVERAL DISCRETE VIDEO STREAMS FOR ARTIFICIALLY MAGNIFYING THE DISPLAY ACROSS SEVERAL DISPLAY DEVICES" are also hereby incorporated by reference.

This Patent Application is a continuation-in-part of co-pending U.S. patent application Ser. No. 09/251,586, filed on Feb. 17, 1999 and entitled A METHOD OF AND APPARATUS FOR HANDLING HIGH BANDWIDTH ON-SCREEN-DISPLAY GRAPHICS DATA OVER A DISTRIBUTED IEEE 1394 NETWORK UTILIZING AN ISOCHRONOUS DATA TRANSMISSION FORMAT.

FIELD OF THE INVENTION:

The present invention relates to the field of displaying video and graphics on display devices. The present invention relates to the field of coordinating the display of video and graphics across several display devices.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set.

The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard provides a high-speed serial bus for interconnecting digital devices thereby providing a universal I/O connection. The IEEE 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

In commercially available display systems, it is perceived that the larger the display, the greater the user experience. Accordingly, home theater systems and professional display environments can benefit from large display devices. However, there are limits to the physical size of display devices. Alternatives such as projection systems either do not provide the necessary quality of image or are not feasible for various logistical or expense reasons. An alternative means of achieving a large display system is to scale the video stream across many discrete display devices. Wall-of-video configurations include multiple display devices arranged together to present a video presentation.

The IEEE 1394-1995 standard has been chosen as the industry standard for connecting upcoming generations of audio/video and information technology devices, including digital televisions. When transmitting a digital video stream across an IEEE 1394-1995 network to multiple display devices on a given isochronous channel, conventionally, each display device receiving the given isochronous channel will display the full contents of the stream. In such a configuration, instead of achieving a single display of the video image across multiple display devices, the entire video image is displayed on each display device within the configuration. Currently, there is no known system which controls the partitioning of a video stream across multiple display devices within a wall-of-video configuration.

SUMMARY OF THE INVENTION

An apparatus for partitioning, scaling and displaying video and/or graphics across several display devices includes a video source, a master device and multiple display devices arranged into a multiple display configuration. Preferably, the master device partitions the video stream into image sections and assigns each display device a corresponding image section based on its position within the multiple display configuration. Each display device then preferably receives the video stream and separates the data representing the corresponding image section. Preferably, once the data for the corresponding image section is separated, the display devices then scale their respective image sections to a full screen size image and display the scaled image simultaneously with the display of the entire frame on all display devices within the multiple display configuration. In an alternative embodiment, the master device is responsible for partitioning the video stream into image sections, scaling the image sections, encoding the scaled image sections and transmitting the scaled and encoded image sections to the appropriate display devices within the multiple display configuration. The display devices then simultaneously display the image at an appropriate time based on information in the video stream or as specified by the master device. This process is repeated for each frame within the video stream. In a further alternate embodiment, the multiple display configuration includes a combination of display devices capable of physically partitioning an image section from the video stream and display devices to which the master device partitions, scales, encodes and transmits the image for display.

In one aspect of the invention, a method of displaying images on a multiple display configuration including a plurality of display devices includes the steps of determining capabilities and characteristics of the display devices, partitioning an image into a plurality of image sections each corresponding to a display device within the multiple display configuration, assigning each image section to a corresponding display device, capturing each image section corresponding to each display device from an original data stream, scaling each image section for each display device thereby forming scaled image sections corresponding to each display device and displaying the corresponding scaled image sections at each display device at an appropriate time thereby forming a magnified image across the multiple display configuration representing the image. The method further includes the steps of determining display dimensions of the multiple display configuration, determining image dimensions of the image and calculating a size of each image section. The method further includes the steps of determining a latency value for each of the display devices, determining a worst case latency value for the display devices and communicating the worst case latency value to each of the display devices. The corresponding scaled image section represents a full screen of data for the display device. The steps of capturing and scaling are preferably performed by each display device on the appropriate image section corresponding to the display device. Alternatively, the steps of capturing and scaling are performed by a master device on each appropriate image section. The method further includes the step of encoding each scaled image section into an encoded data stream representing the scaled image section. The step of encoding includes updating a display time value within the encoded data stream. The method further includes the step of transmitting the encoded data stream in a format across a high speed serial interface, wherein the format is a selective one of an MPEG format and a DV format and the high speed serial interface is an IEEE 1394 serial bus network. The encoded data stream for each display device is transmitted over a separate isochronous channel. This method further includes the step of transmitting each scaled image section to each appropriate display device. The step of transmitting alternatively includes combining data representing the scaled image section for an appropriate display device in a stream of data packets, each including an address value corresponding to a memory location within the appropriate display device. The method further includes the step of transmitting a trigger packet on occurrence of a trigger event, the trigger packet including a trigger address value corresponding to a trigger memory location within the appropriate display device. The trigger packet includes a trigger bit, which when written into the trigger memory location, signals that storage of a current scaled image section for display by the appropriate display device is complete. The data packets are preferably isochronous packets. The trigger packet further includes a presentation time value specifying a display time of the scaled image section. The method further includes the step of transmitting the original data stream to each appropriate display device over a high speed serial interface. The high speed serial interface is an IEEE 1394 serial bus network. The original data stream includes a selective one or more of video, graphics and text.

In another aspect of the invention, a method of transmitting images to display devices within a multiple display configuration includes the steps of logically partitioning an image into a plurality of image sections each corresponding to a display device within the multiple display configuration, instructing each display device to physically partition and capture an appropriate image section corresponding to the display device from an original data stream and transmitting the original data stream to each display device. The method further includes the steps of determining display dimensions of the multiple display configuration, determining image dimensions of the image and calculating a size of each image section. The method further includes the steps of determining a latency value for each of the display devices, determining a worst case latency value for the display devices and communicating the worst case latency value to each of the display devices. The method further includes the step of instructing each display device to display its appropriate image section at an appropriate time. The appropriate time is based on the worst case latency. The step of transmitting is completed over a high speed serial interface. The high speed serial interface is an IEEE 1394 serial bus network. The original data stream includes a selective one or more of video, graphics and text.

In another aspect of the invention, a method of receiving images at a display device includes the steps of receiving instructions specifying an appropriate image section within an image to receive, capturing the appropriate image section for each image within an original data stream, scaling the appropriate image section for each image within the original data stream thereby forming a corresponding scaled image section and displaying the corresponding scaled image section at an appropriate time. The corresponding scaled image section represents a full screen of data for the display device. The method further includes the step of receiving the original data stream over a high speed serial interface. The high speed serial interface is an IEEE 1394 serial bus network.

In another aspect of the invention, a method of displaying images on a multiple display configuration including a plurality of display devices and a master device includes the steps of partitioning an image into a plurality of image sections each corresponding to a display device within the multiple display configuration, assigning each image section to a corresponding display device, capturing each image section corresponding to each display device from an original data stream at the master device, scaling each image section for each display device thereby forming scaled image sections corresponding to each display device at the master device, transmitting each scaled image section to each appropriate display device and displaying the corresponding scaled image sections at each display device at an appropriate time thereby forming a magnified image across the multiple display configuration representing the image. The method further includes the step of encoding each scaled image section into an encoded data stream representing the scaled image section, before the step of transmitting is completed. The step of encoding includes updating a display time value within the encoded data stream. The step of transmitting includes transmitting the encoded data stream in a selective one of an MPEG format and DV format across an IEEE 1394 serial bus network. Alternatively, the step of transmitting includes combining data representing the scaled image section for an appropriate display device in a stream of data packets, each including an address value corresponding to a memory location within the appropriate display device. The method further includes the step of transmitting a trigger packet on occurrence of a trigger event, the trigger packet including a trigger address value corresponding to a trigger memory location within the appropriate display device. The trigger packet includes a trigger bit, which when written into the trigger memory location, signals that storage of a current scaled image section for display by the appropriate display device is complete. The data packets are preferably isochronous packets. The trigger packet further includes a presentation time value specifying a display time of the scaled image section. The step of transmitting is performed over a high speed serial interface. The high speed serial interface is an IEEE 1394 serial bus network. The method further includes the steps of determining display dimensions of the multiple display configuration, determining image dimensions of the image and calculating a size of each image section. The corresponding scaled image section represents a full screen of data for the display device. The original data stream includes a selective one or more of video, graphics and text.

In yet another aspect of the invention, an apparatus for configuring and controlling the display of images on a multiple display configuration including a plurality of display devices includes a communications circuit configured for receiving and transmitting data and a control circuit coupled to the communications circuit for partitioning an image into a plurality of image sections each corresponding to a display device within the multiple display configuration, and assigning each image section to a corresponding display device. The control circuit further communicates through the communications circuit to provide instructions to the display devices to configure the display devices to each capture, scale and display an appropriate image section at an appropriate time. The apparatus further includes a capturing circuit coupled to the communications circuit for capturing each image section corresponding to each display device from an original data stream. The apparatus further includes a scaling circuit coupled to the capturing circuit for scaling each captured image section for each display device thereby forming scaled image sections corresponding to each display device. The apparatus further includes an encoding circuit coupled to the scaling circuit and to the communications circuit for encoding the scaled image sections thereby forming encoded image sections and transmitting the encoded image sections to each appropriate display device. The communications circuit is coupled to the display devices by a high speed serial interface. The high speed serial interface is an IEEE 1394 serial bus network.

In yet another aspect of the invention, a display for receiving and displaying images within a multiple display configuration includes a communications circuit configured for receiving and transmitting data, a capturing circuit coupled to the communications circuit for capturing an image section assigned to the display for each image within an original data stream, a scaling circuit coupled to the capturing circuit for scaling each captured image section thereby forming a scaled image section and a display circuit coupled to the scaling circuit for displaying the scaled image section. The display circuit displays the scaled image section at an appropriate time specified by a master device. The scaled image section represents a full screen of data for the display device. The communications circuit is coupled to a master device and to other display devices within the multiple display configuration by a high speed serial interface. The high speed serial interface is an IEEE 1394 serial bus network. The original data stream includes a selective one or more of video, graphics and text.

In still yet another aspect of the invention, a multiple display configuration system includes a plurality of display devices each including a display communications circuit configured for receiving and transmitting data, a capturing circuit coupled to the display communications circuit for capturing an image section assigned to the display for each image within an original data stream, a scaling circuit coupled to the capturing circuit for scaling each captured image section thereby forming a scaled image section and a display circuit coupled to the scaling circuit for displaying the scaled image section and a master device coupled to the plurality of display devices including a master communications circuit configured for receiving and transmitting data and a control circuit coupled to the master communications circuit for partitioning an image into a plurality of image sections each corresponding to one of the display devices and assigning each image section to a corresponding display device. The multiple display configuration further includes a video source coupled to the display devices and to the master device for providing a video stream as the original data stream to be displayed on the display devices. The display circuit displays the scaled image section at an appropriate time specified by the master device. The scaled image section represents a full screen of data for the display device. The display devices and the master device are all coupled together by a high speed serial interface. The high speed serial interface is an IEEE 1394 serial bus network. The original data stream includes a selective one or more of video, graphics and text.

DETAILED DESCRIPTION OF THE PREFERRED EMBODIMENT:

An apparatus for partitioning, scaling and displaying video and/or graphics across several display devices includes a video source, a master device and multiple display devices arranged into a multiple display configuration. The master device determines the configuration of the multiple display configuration including how many display devices are included in each row and column of the multiple display configuration. The master device then logically partitions the video stream into image sections and assigns each display device a corresponding image section based on its position within the multiple display configuration. Each display device then preferably receives the video stream and physically separates the data representing the image section corresponding to the display device. Preferably, once the data for the corresponding image section is separated, the display devices then scale their respective image sections to a full screen size image and display the scaled image simultaneously with the display of the entire frame on all display devices within the multiple display configuration. In an alternative embodiment, the master device is responsible for physically partitioning the video stream into image sections, scaling the image sections, encoding the scaled image sections and transmitting the scaled and encoded image sections to the appropriate display devices within the multiple display configuration. The display devices then simultaneously display the image at an appropriate time based on information in the video stream or as specified by the master device. This process is repeated for each frame within the video stream. In a further alternate embodiment, the multiple display configuration includes a combination of display devices capable of physically partitioning an image section from the video stream and display devices to which the master device partitions, scales, encodes and transmits the image section for display.

Figure 1:
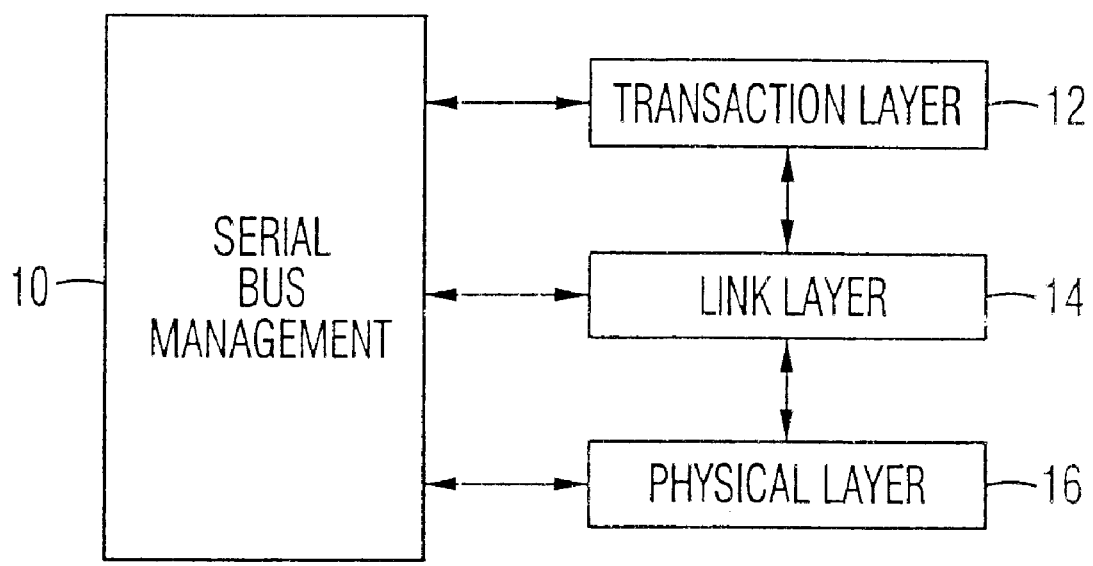
FIG. 1 illustrates a protocol defined by the IEEE 1394-1995 standard.
Figure 2:
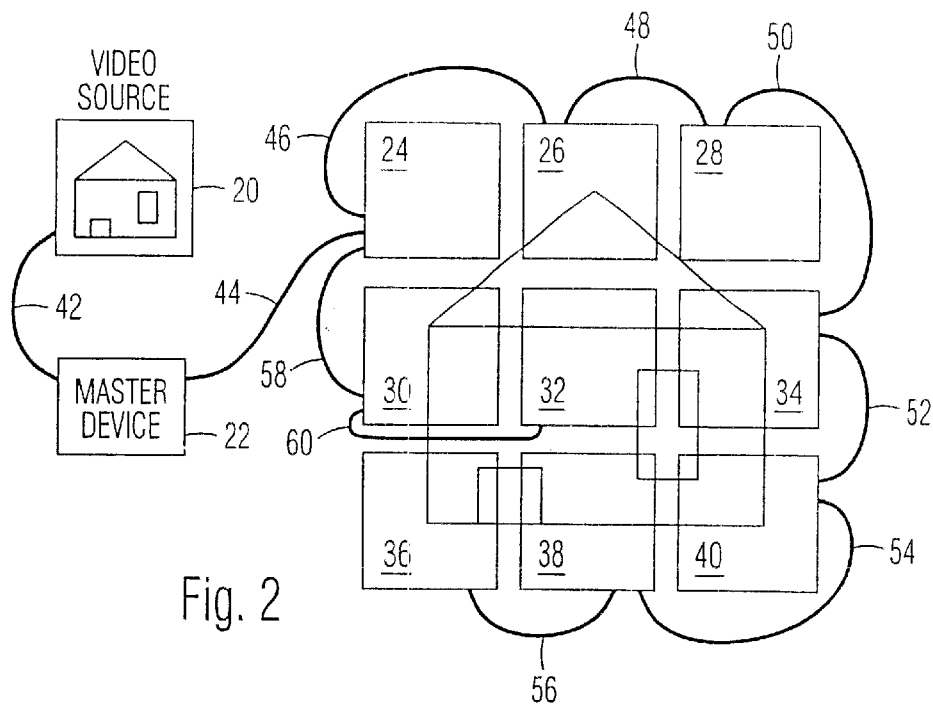
FIG. 2 illustrates an exemplary network of devices forming a multiple display configuration.

A block diagram of an exemplary network of devices including a video source 20, a master device 22 and display devices 24–40 coupled together within an IEEE 1394-1995 serial bus network is illustrated in FIG. 2. The video source 20 is coupled to the master device 22 by an IEEE 1394-1995 cable 42. The master device 22 is coupled to the display device 24 by the IEEE 1394-1995 cable 44. The display device 24 is coupled to the display device 26 by the IEEE 1394-1995 cable 46. The display device 24 is also coupled to the display device 30 by the IEEE 1394-1995 cable 58. The display device 26 is coupled to the display device 28 by the IEEE 1394-1995 cable 48. The display device 28 is coupled to the display device 34 by the IEEE 1394-1995 cable 50. The display device 34 is coupled to the display device 40 by the IEEE 1394-1995 cable 52. The display device 40 is coupled to the display device 38 by the IEEE 1394-1995 cable 54. The display device 38 is coupled to the display device 36 by the IEEE 1394-1995 cable 56. The display device 30 is coupled to the display device 32 by the IEEE 1394-1995 cable 60. Together, the display devices 24–40 form a multiple display or wall-of-video configuration for displaying an enlarged view of a video stream.

The configuration illustrated in FIG. 2 is exemplary only. It should be apparent that an audio/video network could include many different combinations of components. It should also be recognized that data, commands and parameters can be sent in either direction between the devices within the IEEE 1394-1995 network, as appropriate.

The video source 20 is any appropriately configured video generation or delivery device including but not limited to a settop box, a video cassette recorder, a digital video disk, a television and a computer.

The master device 22 is preferably a stand-alone device through which a user has access and control of the IEEE 1394-1995 serial bus network, such as illustrated in FIG. 2. Alternatively, the master device 22 is one of the display devices within the multiple display configuration. The master device 22 has the responsibilities of determining how the video stream is partitioned among the display devices 24–40 within the multiple display configuration and facilitating the partitioning of the video stream within the display devices 24–40.

Figure 3:
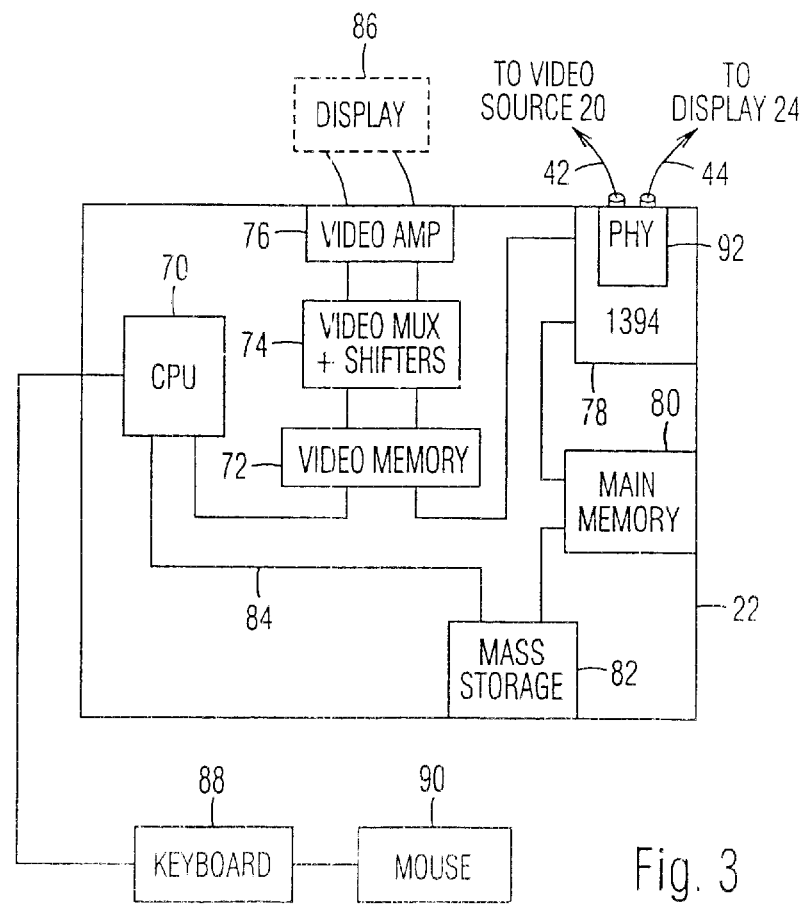
FIG. 3 illustrates a block diagram of the preferred configuration of the master device 22.

A block diagram of the preferred configuration of the master device 22 is illustrated in FIG. 3. Preferably, the master device 22 is a personal computer system. Alternatively, the master device 22 is any appropriately configured device capable of performing the functions of the master device 22 which are herein described. The master device 22 includes a central processor unit (CPU) 70, a main memory 80, a video memory 72, a mass storage device 82 and an IEEE 1394-1995 interface circuit 78, all coupled together by a conventional bidirectional system bus 84. The interface circuit 78 includes the physical interface circuit 92 for sending and receiving communications on the IEEE 1394-1995 serial bus. The physical interface circuit 92 is coupled to the video source 20 and to the display 24, over the IEEE 1394-1995 serial bus cables 42 and 44, respectively. In the preferred embodiment of the present invention, the interface circuit 78 is implemented on an IEEE 1394-1995 interface card within the master device 22. However, it should be apparent to those skilled in the art that the interface circuit 78 can be implemented within the master device 22 in any other appropriate manner, including building the interface circuit onto the motherboard itself.

The mass storage device 82 may include both fixed and removable media using any one or more of magnetic, optical or magneto-optical storage technology or any other available mass storage technology. The system bus 84 contains an address bus for addressing any portion of the memory 72 and 80. The system bus 84 also includes a data bus for transferring data between and among the CPU 70, the main memory 80, the video memory 72, the mass storage device 82 and the interface circuit 78.

The master device 22 is also coupled to a number of peripheral input and output devices including the keyboard 88, the mouse 90 and possibly the associated display 86. The keyboard 88 is coupled to the CPU 70 for allowing a user to input data and control commands into the master device 22. A conventional mouse 90 is coupled to the keyboard 88 for manipulating graphic images on the display 86 as a cursor control device. As is well known in the art, the mouse 90 can alternatively be coupled directly to the master device 22 through a serial port.

A port of the video memory 72 is coupled to a video multiplex and shifter circuit 74, which in turn is coupled to a video amplifier 76. The video amplifier 76 drives the display 86, when it is being used. The video multiplex and shifter circuitry 74 and the video amplifier 76 convert pixel data stored in the video memory 72 to raster signals suitable for use by the display 86.

The display devices 24–40 are preferably each of the same configuration. As will be described below, in the preferred embodiment of the present invention, each of the display devices 24–40 are configured for receiving a video stream and separating, from the video stream, the portion or image section which the respective display device is to display. Alternatively, the display devices 24–40 are appropriately configured display devices of any type which can receive a video stream over an IEEE 1394-1995 serial bus network and display that video stream.

Figure 4:
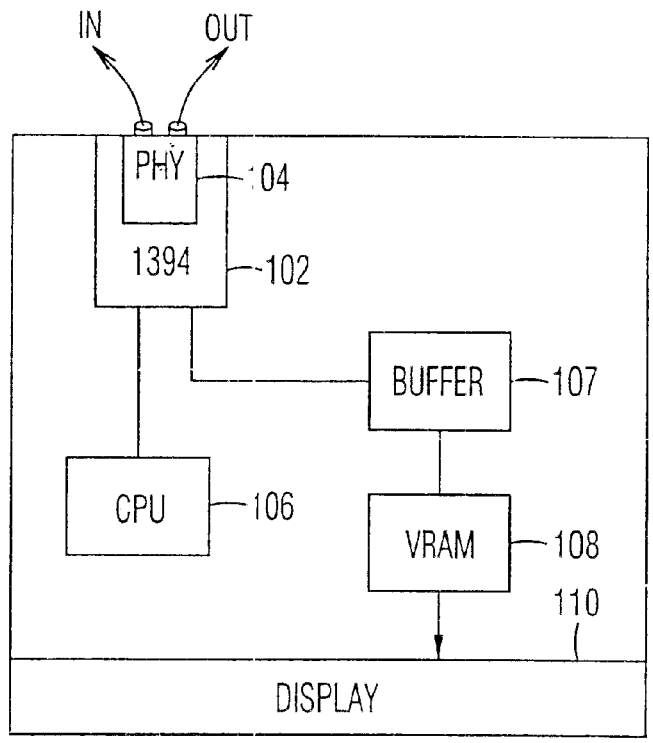
FIG. 4 illustrates a block diagram of the preferred configuration of the display devices 24–40.

A block diagram of the preferred configuration of each of the display devices 24–40 is illustrated in FIG. 4. An IEEE 1394-1995 interface circuit 102 includes a physical interface circuit 104. The physical interface circuit 104 is coupled to other devices within the multiple display configuration, over the IEEE 1394-1995 serial bus cables, as described above. The IEEE 1394-1995 interface circuit 102 is coupled to a CPU 106 for controlling communications between the CPU 106 and devices coupled to the IEEE 1394-1995 serial bus network. The IEEE 1394-1995 interface circuit 102 is also coupled to a memory buffer 107 which stores video data to be displayed. The memory buffer 107 is coupled to a video random access memory (VRAM) circuit 108 for preparing the images within the video stream from the video source 20 for display. The VRAM circuit 108 provides the video signals to the display 110.

Within the master device 22, determining how to partition the received video stream received from the video source 20, among the display devices 24–40 involves the logical allocation of sections of the final magnified image to each display device. The size of an image section depends on the characteristics of the display devices, such as resolution and pixel size. Within the preferred embodiment of the present invention, all of the display devices 24–40 have the same characteristics and capabilities and the multiple display configuration is square, having the same number of display devices in a row as in a column.

Figure 5:
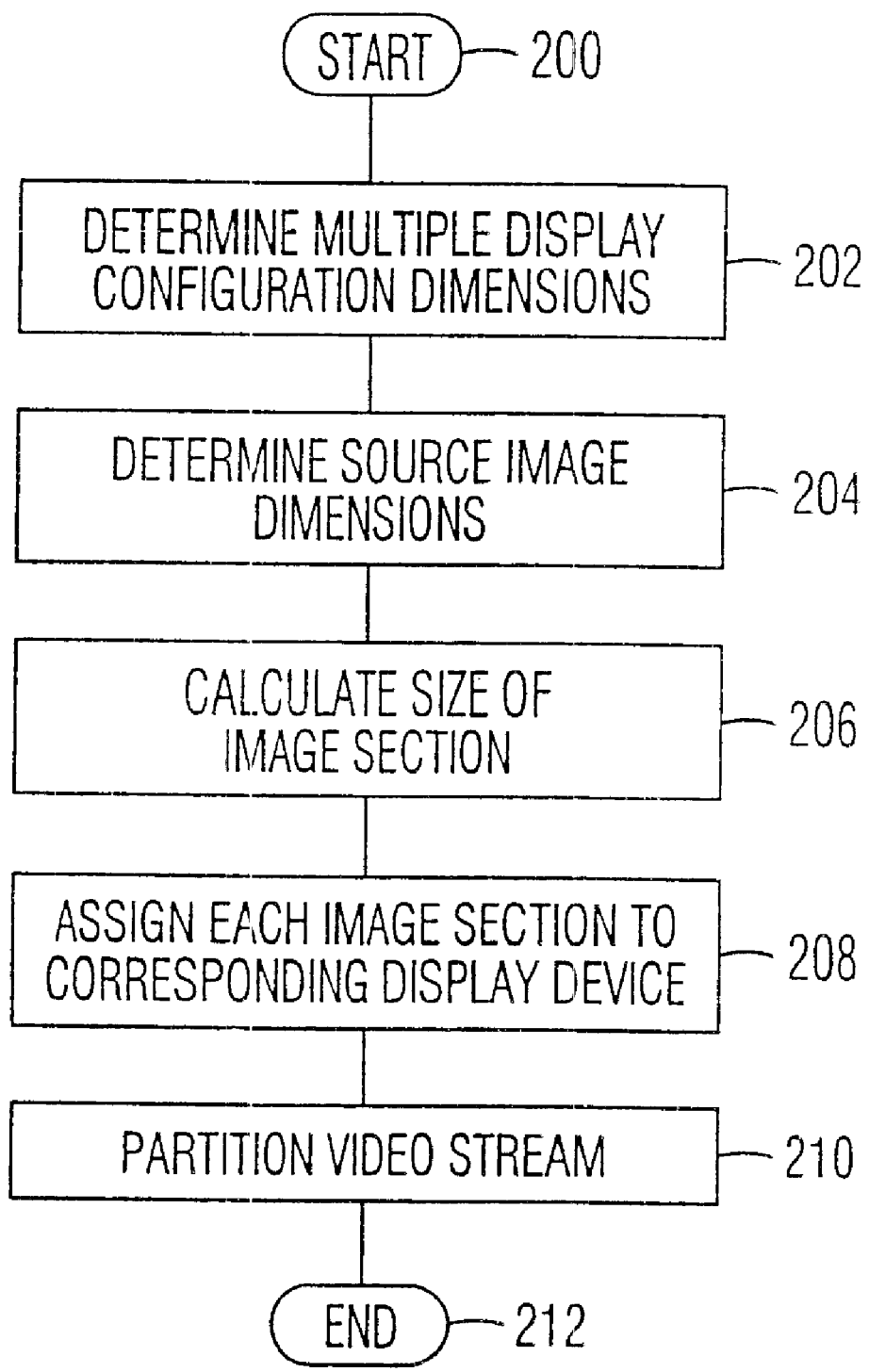
FIG. 5 illustrates a flowchart of the preferred steps performed by the master device 22 when configuring the multiple display configuration for display of a video stream.

A flowchart illustrating the preferred steps performed by the master device when configuring the multiple display configuration for display of a video stream from the source device 20 is shown in FIG. 5. The preferred method of configuring the multiple display configuration for display of a video stream begins at the step 200. At the step 202, the dimensions of the multiple display configuration are determined by the master device 22. The horizontal and vertical dimensions of the images within the video stream from the video source 20 are then determined by the master device 22, at the step 204. The size of each image section is then calculated at the step 206. Each image section is logically assigned to the appropriate display device within the multiple display configuration at the step 208. The video stream is then partitioned among the display devices 24–40 within the multiple display configuration at the step 210. The method of configuring the multiple display configuration for display of a video stream then ends at the step 212.

Figure 6:
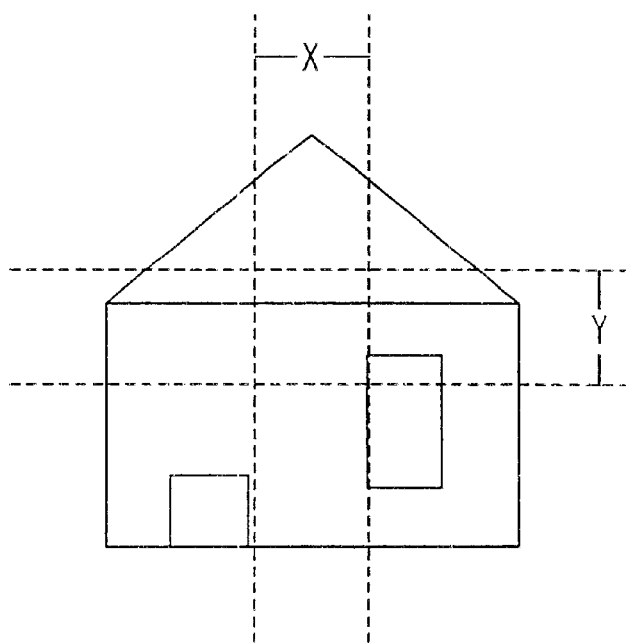
FIG. 6 illustrates a division of an image within the video stream from the source device 20.

A division of the image within the video stream from the source device 20 is illustrated in FIG. 6. Each of the image sections has a horizontal dimension X and a vertical dimension Y which are calculated according to the following equations:

$$X = Sx/\text{number\_of\_displays\_across}$$

$$Y = Sy/\text{number\_of\_displays\_down}$$

The value Sx represents the number of pixels on each line of the source image. The value Sy represents the number of lines within each frame of the source image. The value number_of_displays_across represents the number of displays in the horizontal direction on each row of the multiple display configuration. The value number_of_displays_down represents the number of displays in the vertical direction in each column of the multiple display configuration. In the multiple display configuration illustrated in FIG. 2, the values number_of_displays_across and number_of_displays_down are both equal to three (3). Once the master device has calculated the size of each image section of the source image, each of the image sections is then logically assigned or associated with a corresponding display device within the multiple display configuration.

Figure 7:
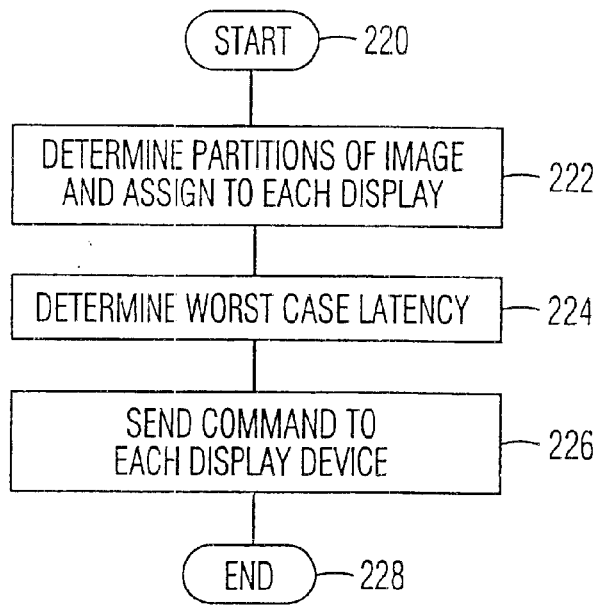
FIG. 7 illustrates a flowchart of the preferred steps performed by the master device 22 when partitioning the video stream among the display devices 24–40 within the multiple display configuration of the present invention.

A flowchart illustrating the preferred steps performed by the master device when partitioning the video stream among the display devices 24–40 within the multiple display configuration is shown in FIG. 7. The preferred method of partitioning begins at the step 220. At the step 222, the partitions of the image are determined and assigned to each display, as described above in relation to the flowchart of FIG. 5. For timing purposes, the worst case latency of all of the display devices 24–40 within the multiple display configuration is determined at the step 224. At the step 226, a command is issued to each of the display devices 24–40 within the multiple display configuration, to initiate the presentation of the video stream on the multiple display configuration. The method of partitioning the video stream among the display devices 24–40 within the multiple display configuration then ends at the step 228.

Depending on the display device implementation and the format of the video stream, the display devices 24–40 will not necessarily finish all tasks simultaneously. As a result, if each of the display devices 24–40 were to display its corresponding screen full of data as soon as it was ready, the resulting image display on the multiple display configuration might appear to be out of synchronization. In order to synchronize the display of images within the video stream, the master device 22 has each of the display devices 24–40 capture and scale an image section to prepare it for display in order to determine the latency of each display device 24-40 in completing these tasks. The master device 22 then determines the display device with the worst case latency from the time it receives a video frame until it is ready to display its partition of that frame. When this worst case latency value is determined, the master device 22 can use it as a baseline to synchronize the activities of all other displays within the multiple display configuration.

Each of the display devices 24-40 determine its latency by carrying out a complete step of decoding a full frame of data, calculating the partition in the lower right corner (the position within the multiple display configuration occupied by the display 40 in FIG. 2) and scaling this partition in preparation for display. Each display device tracks the total time it needs to perform all of these actions and then returns this value, measured in the appropriate units of time, to the master device 22 in response to the issued command. Preferably, when determining its latency, a display device will not actually show the test image on its screen. Alternatively, if the display device has advance knowledge of its inherent delay, it will immediately return this value to the master device 22 in response to the issued latency command.

To determine the worst case latency value, the master device 22 preferably sends the following command, represented here in interface definition language (IDL), to each of the display devices 24-40 within the multiple.display configuration:

CalculateWallOfVideoDelay(in stream_ID, in partition_location, out delay);

The parameter stream_ID represents the identifying value of the incoming stream to be used for the multiple display configuration, in case the display device supports multiple incoming streams. The parameter stream_ID preferably takes into account that the nature of the stream format is either specified or has already been specified when the connection and the isochronous channel was initialized. The parameter partition_location specifies the position of the test partition within the multiple display configuration, which is the partition in the lower right corner of the multiple display configuration. The parameter delay specifies the delay value as calculated or known by the display device, which is returned to the master device 22.

When the master device 22 has completed the previously described preparation tasks for determining partitions and synchronizing the display of the video stream on the multiple display configuration, it instructs the display devices 24-40 within the multiple display configuration to begin displaying the video stream. This is accomplished by sending the following command, represented here in IDL, to each of the display devices 24-40 within the multiple display configuration:

DisplayIncomingStreamPartition(in stream_ID in matrix_dimensions, in assigned_position, in start_time, in delay);

The parameter stream_ID represents the identifying value of the incoming stream to be used for the multiple display configuration, as described above. The parameter matrix_dimensions specifies the horizontal and vertical dimensions of the multiple display configuration matrix. The parameter assigned_position specifies which particular matrix position within the multiple display configuration, the current display is to decode and display. The parameter start_time specifies when the display device is to start displaying the video stream. Preferably, the parameter start_time specifies an IEEE 1394-1995 bus time, such as "start at 1394 bus time X," where X is chosen by the master device 22 based on the number of display devices it must send commands to, and the expected latency of the asynchronous transactions needed to carry out the command deliveries.

Alternatively, a protocol that supports a multicast or broadcast of the begin command is used. In this alternative embodiment, a two-stage command process is utilized. In the first stage, the master device 22 sends a command to each of the display devices 24-40 including the parameters as shown above, except for the parameter start_time. Then, after the master device 22 has received acknowledgements from each of the display devices 24-40, it will then send a multicast command to the display devices 24-40, instructing the display devices 24-40 to begin displaying the video stream. All of the display devices 24-40 will receive this command at the same time and will then simultaneously start displaying the video image. The parameter delay specifies the display synchronization value for each video frame. Once the display device has done the necessary calculations and has a screen's worth of data to be displayed, the display device waits until this delay value has passed and then displays the frame.

Once the master device 22 has determined the partitions of the image, assigned each partition to a display device 24-40 and issued the partitioning command, the initial responsibilities of the master device 22 are complete. However, preferably the master device 22 is also responsible for tracking and maintaining the configuration of the multiple display configuration, responding to commands and appropriately notifying other devices within the IEEE 1394-1995 serial bus network of changes.

Figure 8:
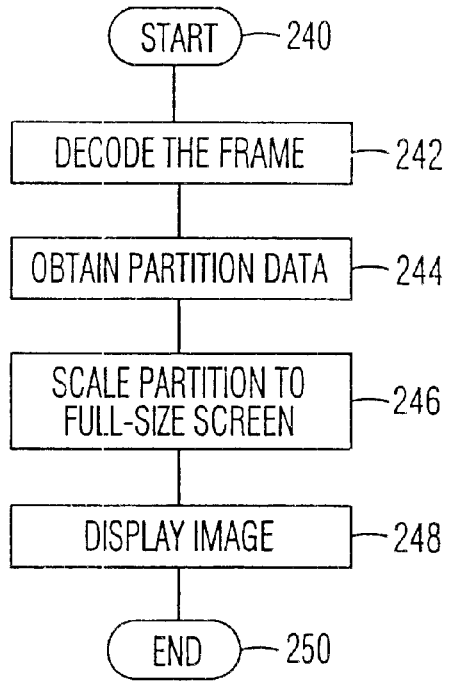
FIG. 8 illustrates a flowchart of the preferred steps performed by the display devices 24–40 when obtaining and displaying data for each frame within the video stream of data.

After receiving the partition command from the master device 22, in the preferred embodiment of the present invention, each of the display devices 24-40 are then responsible for managing the distributed display of the expanded image for the corresponding partition. A flowchart illustrating the preferred steps performed by each of the display devices 24-40 when obtaining and displaying data for each frame within the video stream is shown in FIG. 8. The preferred method of obtaining and displaying each frame begins at the step 240. At the step 242, the display device decodes the data representing the frame to be displayed by all of the display devices 24-40. The task of decoding is specific to the data format of the frame, e.g. MPEG2, MPEG4, MPEG7, DV, or any other appropriate format. Depending on the particular data format, it could be necessary to decode the entire frame before proceeding to the next step, or it might be possible to optimize the process by having each display device only decode the data corresponding to its respective partition. After decoding the frame data, each respective display device then calculates the particular set of bits within the frame that constitute the display device's image section of the full frame image, at the step 244. If the decoding process is optimized by having each display device only decode the data corresponding to its respective partition, then the decoding and partitioning steps 242 and 244 are combined into a single step. At the step 246, the display device's image section is expanded and scaled to fit the full screen size of the display device. The display device then displays the expanded and scaled image, at the step 248, at the time specified by the master device 22. The method of obtaining and displaying the frame then ends at the step 250. This method illustrated in FIG. 8 is then repeated by each of the display devices 24-40 for each frame within the video stream.

When expanding and scaling its image section, each display device must scale each line and pixel within its image section from the partition size to the final display size. The scaling factors are the ratio of the partition size to the resolution of the display device and are calculated according to the following equations:

ScaleX=display_horizontal_resolution/partition_horizontal_resolution

ScaleY=display vertical_resolution/partition_vertical_resolution

Once the scaling factors ScaleX and ScaleY are determined, each pixel is multiplied by the scaling factor ScaleX and each line is multiplied by the scaling factor ScaleY in order to generate a full-size screen image for display by the display device. As an example, using the configuration illustrated in FIG. 2, consider that the source image generated by the video source 20 has a horizontal or X dimension of 300 pixels and a vertical or Y dimension of 300 pixels. The partition for each display device is then 100 pixels by 100 pixels. In this example, also consider that the display devices 24–40 within the multiple display configuration are to be set to a resolution of 1000 pixels in the horizontal dimension by 800 lines in the vertical dimension. The resulting scaled image displayed on the multiple display configuration will then be 3000 pixels by 2400 pixels. Accordingly, the scaling factor ScaleX is then equal to the display horizontal resolution of 1000 pixels divided by the partition horizontal resolution of 100 pixels, thereby yielding a scaling factor ScaleX equal to 10. In this example, the scaling factor ScaleY is then equal to the display vertical resolution of 800 pixels divided by the partition vertical resolution of 100 pixels, thereby yielding a scaling factor ScaleY equal to 8. Accordingly, to scale this image, each pixel is represented by a block having the same color value as the pixel. On the display, each block has a size corresponding to the scaling factors ScaleX and ScaleY. In this example, each block has a size of 10 pixels in the horizontal direction and 8 pixels in the vertical direction. Accordingly, for each original pixel within the image section of the source image for a given display, a block of 10 pixels in the horizontal direction and 8 pixels in the vertical direction having the same color value as the original pixel is displayed, thus magnifying the original source image across the display devices within the multiple display configuration.

Preferably, the display resolutions and source image sizes have numeric relationships that do not result in fractions of pixels in the horizontal or vertical direction after calculation of the partition sizes or scaled images. The above scaling example illustrates the scaling calculation of the preferred embodiment of the present invention. Alternatively, any other appropriate scaling calculation can be used to expand and scale the image from the partition size to a full screen size.

When displaying an image from a video stream on a multiple display configuration as illustrated in FIG. 2, it is necessary to ensure that all of the display devices 24–40 display their respective image sections at exactly the same time. If the image sections are not coordinated and simultaneously displayed, then the viewer will see anomalies such as partially mixed images from different frames within the video stream. In order to achieve this simultaneous display, all of the display devices are synchronized to a common time base and must take into account any delays between the time when the data is received by the display device and the time when a fully scaled image is ready to be presented on the display device.

Preferably, the native time base within the video stream is utilized to synchronize all of the display devices. All of the display devices are working from a common isochronous stream of data received on the same isochronous channel. Therefore, each of the display devices are receiving the same timing data from within the isochronous stream of data. This timing data is therefore utilized by the display devices to ensure that each image section of each frame within the video stream is synchronized and simultaneously presented on the multiple display configuration.

Alternatively, the bus time of the IEEE 1394-1995 serial bus network is utilized to synchronize all of the display devices. However, when using the bus time of the IEEE 1394-1995 serial bus network there is a risk of image degradation when bus resets occur. A bus reset on the IEEE 1394-1995 serial bus network causes the bus time values to change. If the display devices are processing image sections of a frame within a video stream when a bus reset occurs, then synchronization of the display of frames will be lost until the bus reset activity is complete.

As described above, the master device 22 establishes the worst case latency value by sending a test command to each of the display devices 24–40 and having each of the display devices 24–40 report their processing time values back to the master device 22. The display device with the longest delay value determines the overall delay for the entire set of display devices 24–40. When the master device 22 then configures each display device within the multiple display configuration to begin the presentation of the video stream, the maximum delay value is included within the command, as described above. During the processing of each frame within the video stream, each display device then accounts for its own processing overhead and delay in the processing of the incoming video stream. When the display device has completed its own processing tasks, as described above, and is ready to present the image, it waits until the full delay has expired and then displays the image. By utilizing this technique, a frame within a video stream can be simultaneously displayed across several distributed display devices.

Within the preferred embodiment of the present invention, the master device 22 initiates and coordinates the simultaneous display by the display devices 24–40. In this embodiment, the display devices 24–40 are responsible for receiving, partitioning and scaling the video stream. This embodiment also allows the actual video stream to be communicated to the display devices 24–40 on a single isochronous channel. However, the preferred embodiment requires that the display devices 24–40 are all capable of implementing the present invention. Display devices 24–40 which are not capable of implementing the present invention can not be used within the multiple display configuration of the preferred embodiment.

In an alternate embodiment of the present invention, the master device 22 is not only responsible for initiating and coordinating the simultaneous display of the video stream, but is also responsible for partitioning, scaling and encoding each of the frames within the video stream before each image section is transmitted to the display devices 24–40. In this embodiment, any display device capable of receiving a video stream of data can be utilized within the multiple display configuration. In this alternate embodiment, the display devices 24–40 are provided full screen image data by the master device 22 and are responsible for receiving, decoding and displaying the full screen image data as it arrives on the IEEE 1394-1995 serial bus interface.

Figure 9:
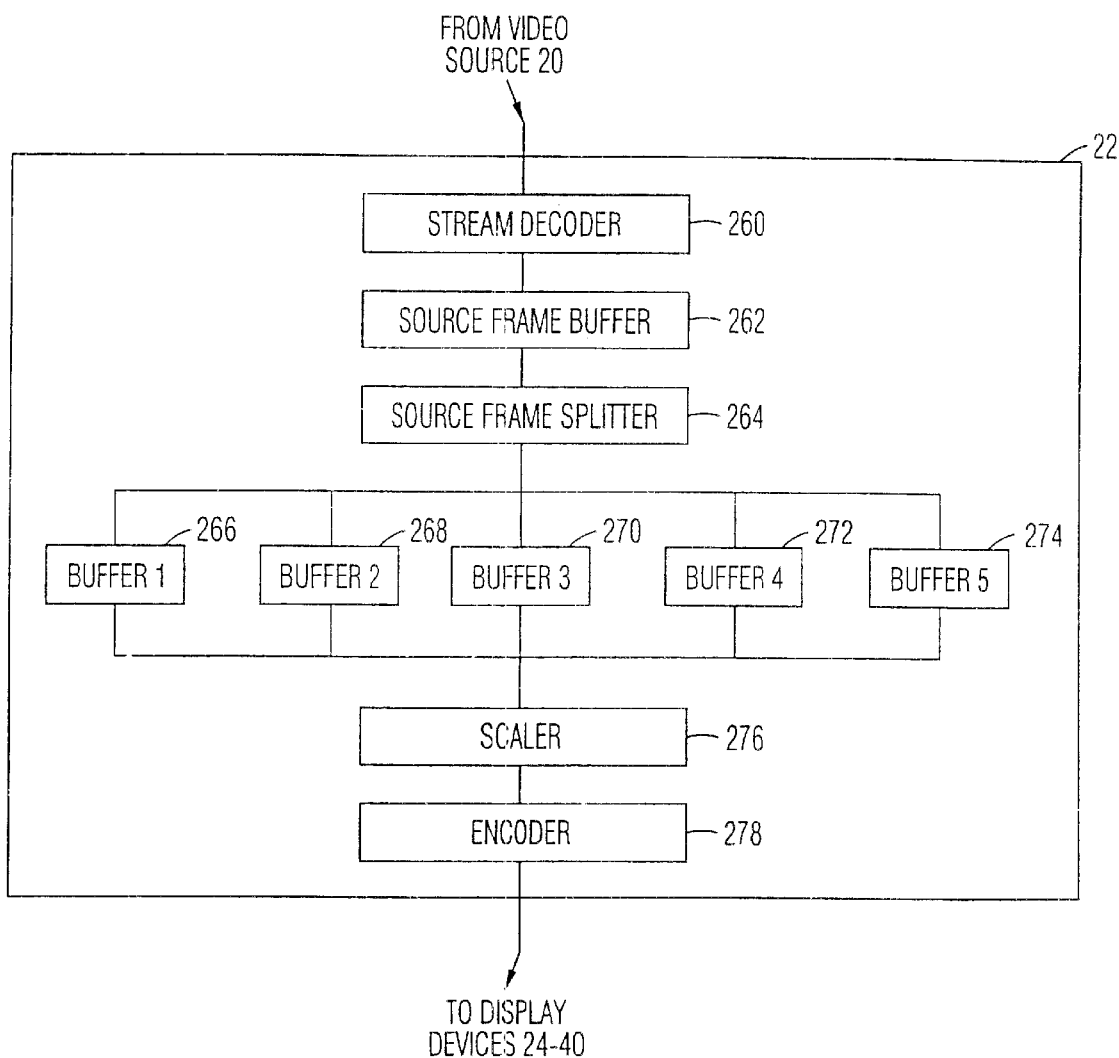
FIG. 9 illustrates a block diagram of an alternate embodiment of the master device 22.

A block diagram of the master device 22 within this alternate embodiment showing the flow of data through the master device 22 is illustrated in FIG. 9. In this embodiment, the master device 22 includes a stream decoder 260 coupled to receive the video stream from the video source 20. The stream decoder 260 is coupled to provide the decoded video stream to a source frame buffer 262. From the source frame buffer 262, the decoded video stream is provided to a source frame splitter 264, which partitions the decoded video stream into the image sections for the display devices and stores each image section in an appropriate buffer 266–274. From each of the buffers 266–274, the data for each image section is provided in turn to a scaler 276 which scales the image section to a full screen size, as described above. From the scaler 276, the expanded and scaled image section is then provided to an encoder 278 which encodes the data representing the expanded and scaled image section and transmits it over the IEEE 1394-1995 serial bus network to the appropriate display device. In this embodiment, the expanded and scaled image sections for each display device are transmitted over separate isochronous channels on the IEEE 1394-1995 serial bus network.

Figure 10:
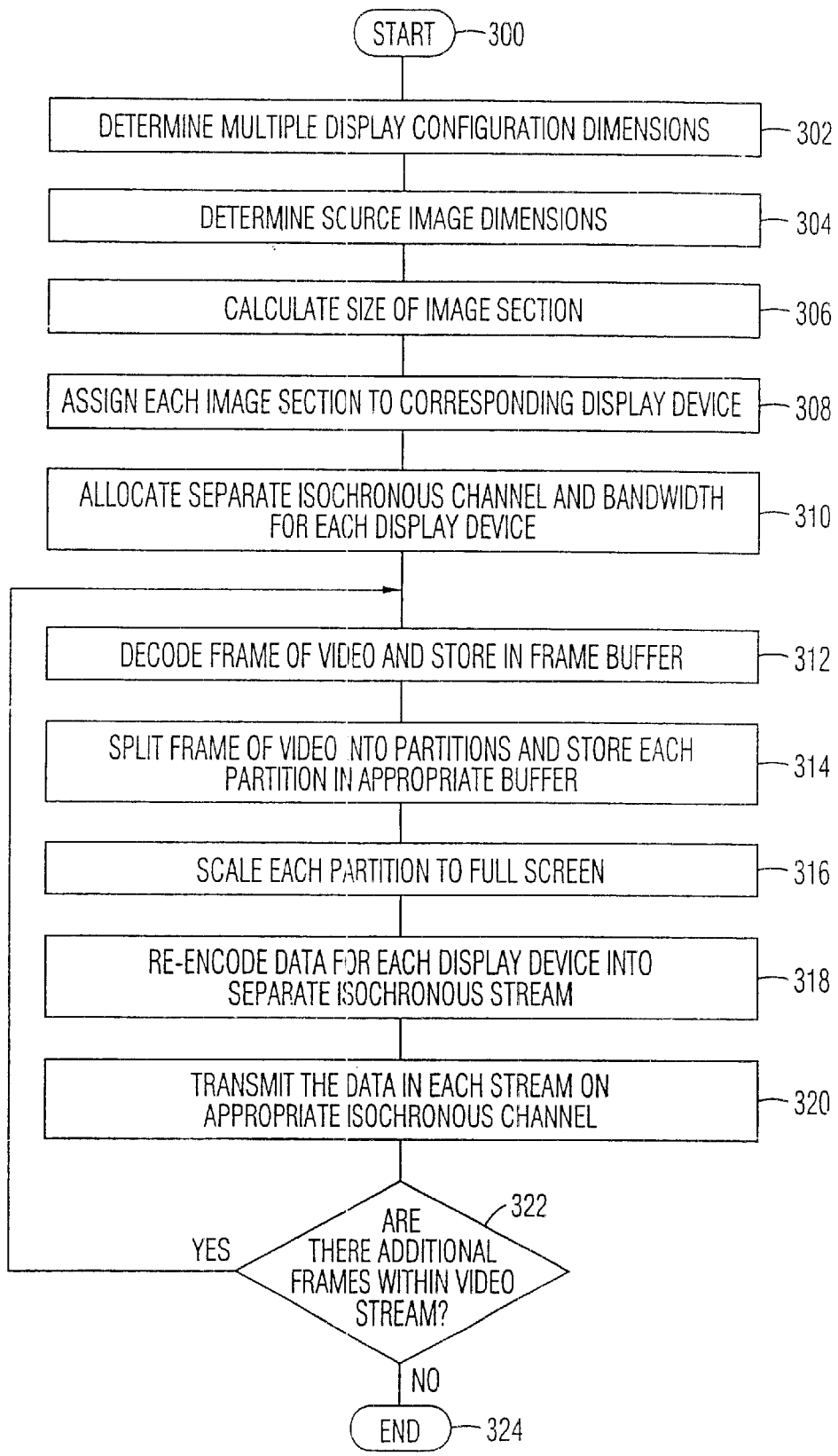
FIG. 10 illustrates a flowchart of the steps performed by the master device 22 in the alternate embodiment when configuring the multiple display configuration for controlling the display of a video stream.

A flowchart illustrating the steps performed by the master device 22 in this alternate embodiment when configuring the multiple display configuration for controlling the display of a video stream from the source device 20 is shown in FIG. 10. The method of configuring the multiple display configuration for display of a video stream begins at the step 300. At the step 302, the dimensions of the multiple display configuration are determined by the master device 22. The horizontal and vertical dimensions of the video stream from the video source 20 are then determined by the master device 22, at the step 304. The size of each image section is then calculated at the step 306. Each image section is logically assigned to the appropriate display device within the multiple display configuration at the step 308. At the step 310, bandwidth and a separate isochronous channel are allocated for each display device 24–40 within the multiple display configuration. At the step 312, the master device 22 decodes the data representing the frame to be displayed by all of the display devices 24–40. As described above, the task of decoding is specific to the data format of the frame, e.g. MPEG2, DV and any other appropriate format. Depending on the particular data format, it could be necessary to decode the entire frame before proceeding to the next step, or it might be possible to optimize the process by having the master device 22 decode the data corresponding to each respective partition in sequence and storing it in the appropriate partition buffer 266–274.

After decoding the frame data, then the master device 22 partitions the frame data into the image sections and stores each image section in the corresponding partition buffer 266–274, at the step 314. If the decoding process is optimized by having the master device 22 decode and store the data corresponding to each respective partition in sequence, then the decoding and partitioning steps 312 and 314 are combined into a single step. This alternative would not require the full frame buffer 262, but the incoming decoded stream would pass through the source frame splitter 264 and be stored within the appropriate partition buffers 266–274. At the step 316, the image section for each partition is received, in turn, from the appropriate one of the buffers 266–274 and scaled by the scaler 276, as described above. In a further alternate embodiment, a separate scaler is included to correspond to each of the buffers 266–274. In still a further alternate embodiment, a separate encoder is included to correspond to each of the buffers 266–274.

After the image sections have been scaled at the step 316, the data for each image section is encoded, at the step 318, into a specific standard format such as MPEG, which is understood by the display devices 24–40. In this encoding step, the master device 22 accounts for timing and synchronization of the separate streams by encoding the streams with the same time base. At the step 320, the encoded image section data is then transmitted on the appropriate isochronous channel to the appropriate display device. At the step 322, it is then determined if there are any more frames to be displayed within the video stream. If there are additional frames within the video stream then the process jumps back and repeats the steps 312–320 for each frame within the video stream. When there are no additional frames within the video stream then the method of configuring and controlling the multiple display configuration ends at the step 324.

In this embodiment, when a stream format such as MPEG, which includes timing information, is utilized to transmit image sections to the display devices 24–40, the master device 22 updates the original MPEG stream "display time" as part of the re-encoding process. To update the stream display time, the master device 22 replaces the original stream display time for a frame with a new value that compensates for the display latencies, in order to maintain a synchronized presentation across all of the display devices 24–40 within the multiple display configuration. The separate streams for the display devices 24–40 are then transmitted using a standard protocol such as MPEG over the IEEE 1394-1995 serial bus network. To maintain a consistent frame rate across all of the display devices 24–40, the master device 22 has the ability to drop frames, if necessary, in order to compensate for the slowest display device.

In a further alternate embodiment, the video data is encoded into a custom isochronous data format as described herein and in U.S. patent application Ser. No. 09/251,586 filed on Feb. 17, 1999 and entitled A METHOD OF AND APPARATUS FOR HANDING HIGH BANDWIDTH ON-SCREEN-DISPLAY GRAPHICS DATA OVER A DISTRIBUTED IEEE 1394 NETWORK UTILIZING AN ISOCHRONOUS DATA TRANSMISSION FORMAT, which is hereby incorporated by reference. In this embodiment, the video data is encoded into packets of isochronous data, each of which includes an address value corresponding to a memory address within the display device forming the buffer 107. When received by the display device, the video data is loaded into the appropriate memory locations within the buffer 107 corresponding to the address values. A trigger packet is sent by the master device 22 at the end of the data stream for an image section of the current frame. The trigger packet includes a presentation time value corresponding to a display time for the image section of the current frame. When the trigger packet is received, the display device transfers the data stored in the buffer 107 to the VRAM circuit 108 for display at the specified presentation time. Using the same presentation time for all of the display devices 24–40, the master device 22 can control the synchronization of each frame within the video stream.

Figure 11:
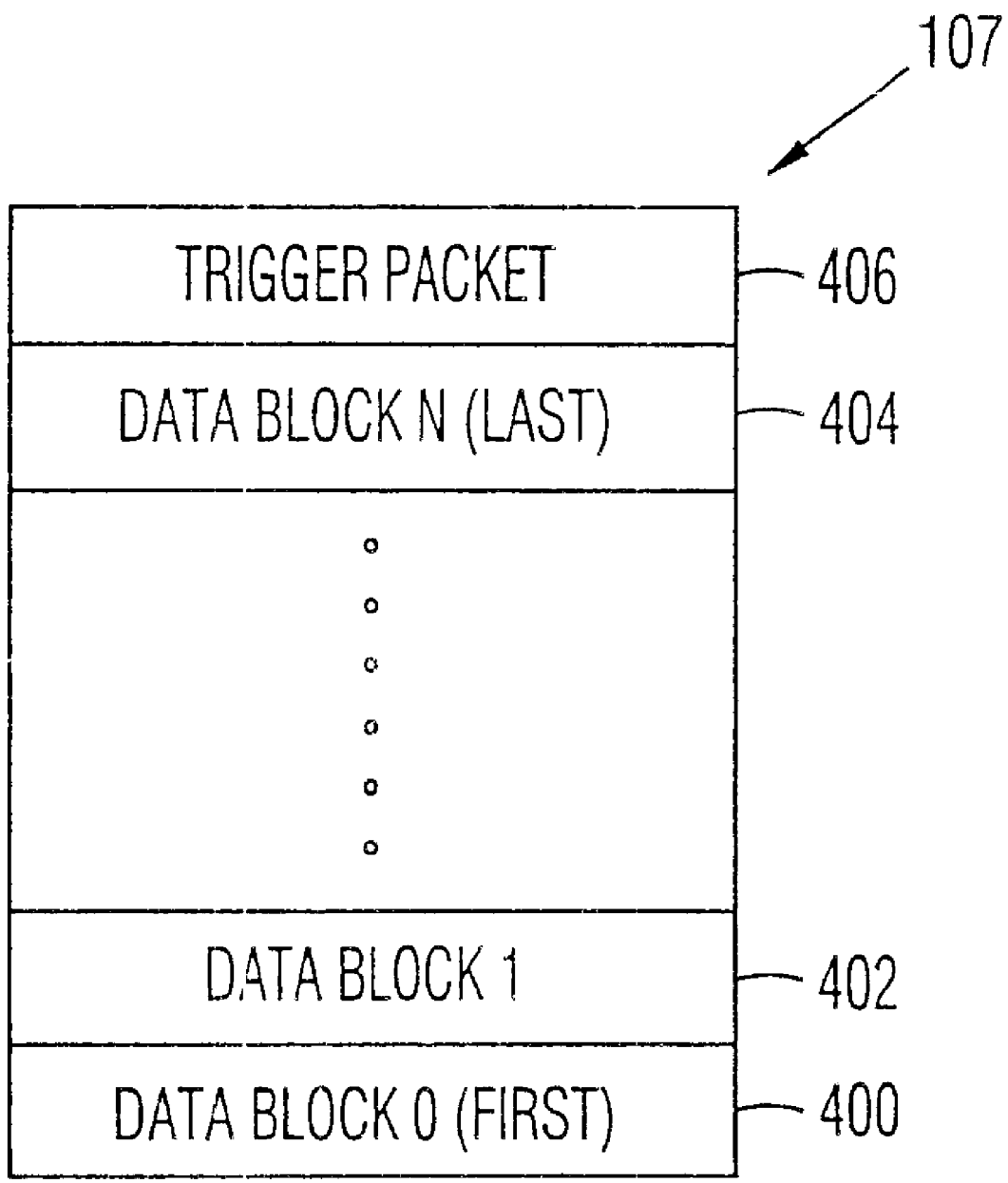
FIG. 11 illustrates a configuration of the memory buffer 107.

In this alternate embodiment, the buffer 107 is configured as illustrated in FIG. 11. The buffer 107 includes a number of memory storage locations 400–406 in which collectively a frame of data is stored. Each of the memory storage locations 400–406 is individually addressable. However, when writing to the memory buffer 107, after an address is specified, data is written to successively increasing addresses within the memory buffer 107 until a subsequent address value is provided. Preferably, the final storage location 406 within the memory buffer stores the trigger packet which is used to time the display of data within the memory buffer 107. Alternatively, the trigger packet is stored within any other appropriate and designated trigger memory buffer or location.

A differential encoding scheme can be employed within this alternate embodiment to transmit data from the master device 22 to the display devices 24–40. Using this differential encoding scheme, only packets with data changing from the previous frame to the current frame are transmitted from the master device 22. The packets transmitted from the master device 22 with changing video data are then written into the appropriate memory storage locations within the memory buffer 107. When all of the changed packets for the current frame are loaded into the memory buffer 107, the trigger packet is then loaded into the final storage location 406. This differential encoding scheme minimizes the amount of data required to be transferred for each successive frame of video data. Alternatively, the entire frame of data is transmitted from the master device 22 to the display devices 24–40 for each frame of video data within the video stream.

As will be described in detail below, the trigger packet includes two quadlets of data. The most significant bit of the first quadlet is a trigger bit t which is set to a logical high voltage level. When the display device detects that the trigger bit within the memory buffer has been set to a logical high voltage level, that signals that the storage of the current frame within the memory buffer 107 is completed. The second-most significant bit of the first quadlet within the trigger packet is an overlay bit o, which is used when transmitting on-screen-display graphics data and specifies whether or not the current on-screen-display graphics data frame is to be overlaid on a video data frame. If the overlay bit o is at a logical high voltage level, then the current on-screen-display graphics data frame is to be overlaid on a video data frame. If the current on-screen-display graphics data frame is to be overlaid on a video data frame, the display device mixes the current on-screen-display graphics data with the video data. Otherwise, if the overlay bit o is at a logical low voltage level, then the current on-screen-display graphics data frame is not to be overlaid on a video data frame. When transmitting pure video data, the overlay bit o is not utilized. The remainder of the first quadlet is reserved and not used. The second quadlet within the trigger packet includes the presentation time value which specifies at which time, the current video data frame should be displayed. This presentation time value specifies a time from immediate display to display at any appropriate time value represented by the presentation time value.

In the alternate embodiment, the master device 22, divides the scaled and encoded data into portions corresponding to isochronous packets to be transmitted over the IEEE 1394-1995 serial bus to the display devices 24–40. An image section for a particular display device is divided into blocks of data, each of a size appropriate for transmission within an isochronous data packet. When differential encoding is used, only those packets with pixels which are different in the new frame are sent to the display device. However, because each data packet is delivered to a certain address within the memory buffer 107, a quadlet is sent when a pixel within any quadlet is changed. Accordingly, a minimum of four bytes is included within any differentially encoded data packet.

Figure 12:
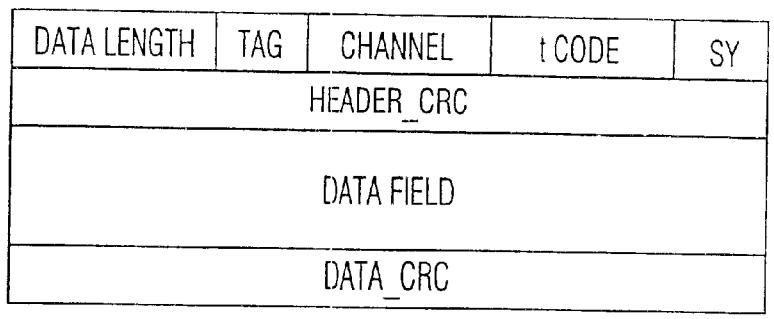
FIG. 12 illustrates a format of an isochronous data packet for transmitting video data over an IEEE 1394-1995 serial bus network.

A format of an isochronous data packet for transmitting video data over an IEEE 1394-1995 serial bus network from the master device 22 to the display devices 24–40 is illustrated in FIG. 12. The format of the data packet also complies with the ISO/IEC 61883 standard. The isochronous data packet includes a packet header and a data field or payload. The isochronous packet header includes a data_length field, a tag field, a channel field, a tCode field, an sy field and a header_CRC field. The data_length field contains a value representing the number of bytes of data within the data field, including the number of bytes within a CIP (common isochronous packet) header included in the packet. The tag field provides a high level label for the format of data carried by the isochronous packet. The channel field contains the channel number on which the isochronous packet is transmitted. The tCode field contains a transaction code for the packet. For isochronous data packets, the tCode field contains either a value of Ah or Ch. The sy field contains a synchronization flag used in some applications to synchronize the data in the current isochronous packet with some application specific event.

Figure 13:
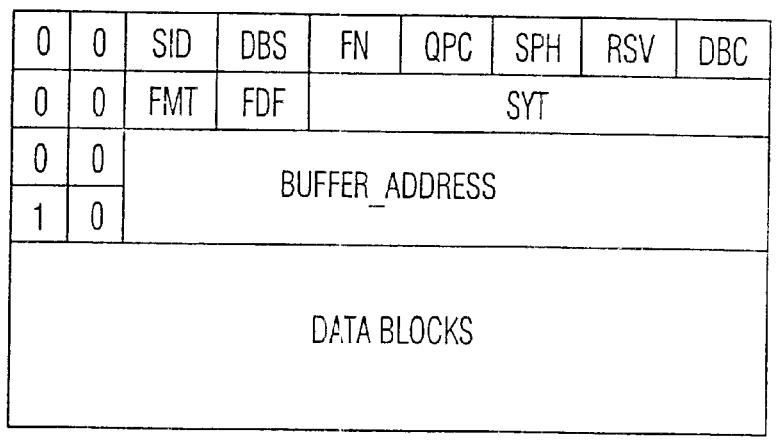
FIG. 13 illustrates a format of the data field of the isochronous data packet used to transmit video data.

A format of the data field of the isochronous packet used to transmit video data according to the present invention is illustrated in FIG. 13. The data field includes an extended CIP header and a data portion. The extended CIP header includes an end of header bit within each quadlet and a form bit within the two most significant bits of each quadlet. In the preferred format of the extended CIP header, the end of header bit is not set to a logical "1" until the fourth and last quadlet within the extended CIP header. When the end of header bit has a value of logical "1," this signals that the current quadlet is the last quadlet within the CIP header. Within the CIP header, the SID field contains the source node ID value of the transmitting node. The DBS field contains a value representing the size of the data block in quadlets. The FN field contains a fraction number representing the number of data blocks into which a source packet is divided. The QPC field contains a value representing the number of dummy quadlets added to a source packet to equalize the size of the divided data blocks. If the FN field indicates that the source packet is not divided, then the QPC field will contain a value equal to zero. The SPH flag represents whether or not the source packet includes a source packet header. The SPH flag is set equal to a logical "one" when the source packet does include a source packet header. The rsv field is reserved for future extension. The DBC field is the continuity counter of data blocks to detect a loss of data blocks. The FMT field includes a format identifier which identifies the format of the packet. The FDF field is a format dependent field and depends on the format of the packet. The SYT field is used to synchronize the transmitter and the receiver. The buffer_address field contains the address to which the video data contained within the isochronous packet is to be stored within the memory buffer 107. The remaining data portion contains the actual video data payload within the isochronous packet.

Figure 14:
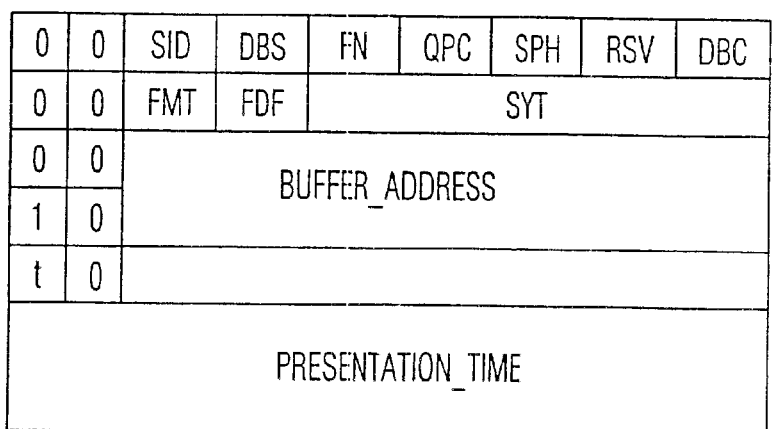
FIG. 14 illustrates a format of the data field for a trigger packet.

A trigger packet is preferably an isochronous data packet and has the same format as illustrated in FIG. 12. The data field however is different than the data field for a video data packet as illustrated in FIG. 13. A format of a data field for a trigger packet is illustrated in FIG. 14. The format of the extended CIP header portion of the data field is the same as the format illustrated in FIG. 13, and discussed above. The buffer_address field contains the value representing the address to which the trigger packet is to be written. Within the data payload, the trigger packet preferably includes three quadlets. The first quadlet includes a trigger bit t as the most significant bit, which is set to a value of logical "1" for a trigger packet. The second-most significant bit of the first quadlet within the trigger packet is an overlay bit o. As described above, the overlay bit o is only utilized with on-screen-display graphics data and specifies whether or not the current on-screen-display graphics data frame is to be overlaid on a video data frame. The second and third quadlets within the trigger packet include the presentation_time field which preferably contains a sixty-four bit value representing a time value at which the current frame of video data is to be displayed. A presentation_time value of all logical "0"s specifies an immediate presentation time.

When the trigger bit t is written, the display device is notified that the buffer 107 includes a full frame of video data ready to be displayed at the appropriate presentation time. The data is then transferred to the VRAM circuit 108, for display at the time specified by the presentation time value. In some configurations of this alternate embodiment, it is possible that the trigger bit is not necessary. In a further alternate embodiment, a write transaction of the trigger packet including the presentation time value acts as the trigger event, and the display device then is notified that the buffer 107 includes a frame of video data to be displayed at the time specified by the presentation time value.

This alternate embodiment, as described above, allows any appropriately configured display device to be included within the multiple display configuration. However, this alternate embodiment, requires the master device to decode the source image, partition the source image, scale each partition of the source image and re-encode the scaled source images for each of the display devices. Further, this alternate embodiment also requires isochronous bandwidth and the dedication of a number of isochronous channels to obtain the video stream from the source device 20 and to transmit the partitioned and scaled streams separately to each of the display devices.

In a further alternate embodiment, a combination of display devices which are capable of physically partitioning an image section from the video stream and display devices to which the master device partitions, scales, encodes and transmits the image section for display are included within the multiple display configuration. In this embodiment, the master device 22 determines the capabilities of each of the display devices within the multiple display configuration. The master device 22 then logically partitions the image section as described above. For the display devices capable of physically partitioning an image section, the master device 22 sends a configuration command to inform the display device which image section it is responsible for and to initiate the presentation of the video stream on the multiple display configuration. For the display devices which are not capable of physically partitioning an image section, the master device 22 performs the physical partitioning, scaling and encoding, as described above, and then transmits the encoded steam of data to the appropriate display over the appropriate isochronous channel. In this manner, both types of display devices are utilized within a multiple display configuration. It should also be apparent that multiple master devices 22 could be utilized to configure and control display devices within a multiple display configuration.

Preferably, the management support and controls for the multiple display configuration are exposed to control devices on the IEEE 1394-1995 serial bus network, allowing the control devices to issue commands to the master device concerning the configuration of the multiple display configuration. These commands allow the control device and the user, through the control device, to specify controls such as which display devices are to be used within the multiple display configuration, the configuration and orientation of the image on the multiple display configuration and other appropriate characteristics. Within this preferred embodiment, a configure command is utilized by a control device to initially set up a multiple display configuration and to change an existing multiple display configuration. The configure command in IDL is preferably defined as follows:

ConfigureWallOfVideo(in source_stream, in display_devices, in configuration_ID);

The parameter source_stream provides a reference to a video stream having a structure in IDL as follows:

typedef struct source_stream spec {
device_specifier //specifies which device (AV/C unit and subunit, etc.) has the source data
stream_specifier //specifies which content stream, on the specified device, to use
{

The parameter display_devices specifies the configuration of the display devices and has a structure in IDL as follows:

typedef struct display_devices_spec {
num_devices_across //specifies how many display devices will be used in the horizontal plane
num_devices_down //specifies how many devices will be used in the vertical plane
preferred_resolution //specifies the preferred X,Y resolution to use for each display device
device_ID_list //specifies a list of 1394 GUIDs, one for each display device to use, in the order of //"across then down" (example: for nine display devices of 3 across and 3 down, it // would be the top three, then the middle three, then the bottom three)
}

The master device 22 issues the appropriate commands to each display device 24–40 to set each display device to the appropriate resolution before the master device 22 configures the display devices 24–40 for the multiple display configuration. In the device_ID_list within the parameter display_devices structure, an entry with a GUID of $FFFFFF specifies a blank spot in the display matrix. The master device 22 handles such a blank spot by treating the matrix position for that device as a valid space and calculating the appropriate image partition. However, when it is time to distribute the image section to the display device, that image partition is discarded. In the case of the alternate embodiment described above, it is not necessary for the master device 22 to perform the functions of scaling and encoding for that image partition to be discarded.

The parameter configuration_ID is used to specify which particular multiple display configuration is being configured, if the master device 22 supports more than one multiple display configuration. The parameter configuration_ID specifies a unique identification value for the configuration which is determined by the control device issuing the command. A subsequent configuration command using the same identification value would cause a change to the specified multiple display configuration.

Control devices can use a notify command to ask the master device 22 to notify them if the specified configuration of a multiple display configuration is changed for any reason. The notify command in IDL is preferably defined as follows:

NotifyOfConfigurationChange (configuration_ID);

In the notification message the master device 22 includes the identifier of the multiple display configuration that has changed. In response, the control device can then open and read the appropriate data structures that describe the configuration to determine what specifically has changed.

The master device 22 preferably supports a capability indication data structure which has a structure in IDL as follows:

typedef struct wall_of_video capability_indicator {
number_of_configurations_supported
number_of_stream_types_supported //specifies how many of the following arrays are in the

```
struct supported_stream_type_I //DV, MPEG2, etc.
number_of_direct_streams_supported_1 //for option 2-
   depends on the stream format and the . . . //type of
   conversions required (MPEG2, DV, etc.) supported_
   stream_type_n number_of_direct_streams_
   supported_n
}
```
The parameter number_of_configurations_supported specifies how many multiple display configurations the master device 22 can handle at any given time. The parameter number_of_stream_types_supported specifies how many different data formats are supported in the case of the alternate embodiment when the master device 22 is partitioning, scaling and encoding the partitions within the video stream. For each of the supported stream types, there will be an array of pairs having a format of {supported_stream_type_x, number_direct_manipulations_x} following in the structure. The parameter supported_stream_type_x contains an enumerated value that specifies which stream type is being described. Supporting a particular stream format means that the master device 22 has the ability to decode the stream and re-encode individual streams for display devices in the case of the alternate embodiment. The parameter number_of_direct_streams_supported_x specifies how many streams of the specified type can be handled simultaneously by the master device 22. The value of this parameter will influence the dimensions of the multiple display configuration that can be supported by the master device 22.

The master device 22 also preferably supports a current configuration status data structure which has a structure in IDL as follows:
```
typedef struct current_configuration_status {
//for each active wall-of-video configuration, copy the
   parameters of the Configure command to this structure
}
```
This current_configuration_status structure contains the status information for the currently active multiple display configurations being managed by the master device 22. This status includes information about which stream is being magnified for the configuration, and what display devices are in the configuration.

In order to support the preferred embodiment of the present invention and partitioning the video stream across multiple display devices, the display devices 24–40 of the preferred embodiment support the commands of the preferred embodiment, as described above. The display devices 24–40 also preferably support a capabilities data structure which has a structure in IDL as follows:
```
typedef struct wall_of_video_display_capabilities {
number_of_simultaneous_streams_supported
stream_formats_supported
}
```
The parameter number_of_simultaneous_streams_supported specifies how many simultaneous streams the particular display device can handle for a multiple display configuration. Using the techniques of the present invention, it is possible, to not only have a main screen of video magnified across several devices, but also a picture-in-picture image magnified across several devices as well. The parameter stream_formats_supported specifies the list of video stream formats supported by the display device. This parameter is necessary to match the output of the source device 20 within the capabilities of the display devices.

The display devices 24–40 also preferably support a status data structure which has a structure in IDL as follows:
```
typedef struct wall_of_video_display_status {//copy
   parameters from DisplayIncomingStreamPartition( )
   command
}
```

As with the status data structure of the master device 22, each display device 24–40 within the multiple display configuration preferably has a status data structure that can be examined by the master device 22 or by any other control device within the IEEE 1394-1995 serial bus network. This status data structure can reflect the current state of the multiple display configuration of the display device by copying the parameters of the DisplayIncomingSreamPartition( ) command.

In operation, a video stream is initiated by the video source 20 and the master device 22 is requested to configure and control the display of the video stream on the multiple display configuration including the display devices 24–40. After receiving this request, the master device 22 then determines the dimensions of the multiple display configuration, including the number of display devices in each row and column of the multiple display configuration. The master device 22 then determines the dimensions of the source image within the video stream from the video source 20 and partitions the source image appropriately by calculating the size of each image section. The master device 22 then assigns each image section to a display device based on its position within the multiple display configuration. Preferably, the configuration command is then transmitted to each of the display devices to instruct those devices to capture, scale and display the appropriate image section data for each frame within the video stream. The master device 22 also preferably determines the worst case latency of the display devices 24–40 within the multiple display configuration in order to calculate a maximum delay value. This maximum delay value is then communicated to each of the display devices 24–40 within the multiple display configuration and utilized to synchronize the display of the images within the video stream.

Preferably, for each frame within the video stream, each of the display devices 24–40, decodes the frame data within the video stream transmitted by the video source 20, obtains the partition image data representing the image section assigned to the display device, scales the partition image data to a full screen size image and displays the full screen size image after the maximum delay value has expired. Alternatively, the master device decodes the frame data within the video stream, partitions the image data into each image section corresponding to each display device, scales the image data for each image section into a full screen size image, re-encodes the scaled image data for each image section into separate isochronous streams and transmits the encoded and scaled image data for each image section on separate isochronous channels, one directed to each of the display devices, as appropriate. In this alternate embodiment, the display devices 24–40 then display the encoded and scaled image data at an appropriate time, as specified by the master device 22.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus. Further, it will be apparent to those skilled in the art that while the multiple display configuration of the present invention has been described as displaying video streams of data, the multiple display configuration of the present invention can also be used to display singularly or in combination, video, graphics, on-screen-display graphics, text, audio or any other appropriate form of communicating with a viewer.

We claim:

1. A method of displaying images on a multiple display configuration including a plurality of display devices comprising the steps of:
    a. determining capabilities and characteristics of the display devices;
    b. partitioning an image into a plurality of image sections each corresponding to a display device within the multiple display configuration;
    c. assigning each image section to a corresponding display device;
    d. capturing each image section corresponding to each display device from an original data stream;
    e. scaling each image section for each display device thereby forming scaled image sections corresponding to each display device;
    f. displaying the corresponding scaled image sections at each display device at an appropriate time thereby forming a magnified image across the multiple display configuration representing the image;
    g. determining a latency value for each of the display devices;
    h. determining a worst case latency value for the display devices; and
    i. communicating the worst case latency value to each of the display devices wherein the worst case latency value is a maximum delay value.

2. The method as claimed in claim 1 further comprising the steps of:
    a. determining display dimensions of the multiple display configuration;
    b. determining image dimensions of the image; and
    c. calculating a size of each image section.

3. The method as claimed in claim 1 wherein the corresponding scaled image section represents a full screen of data for the display device.

4. The method as claimed in claim 1 wherein the steps of capturing and scaling are performed by each display device on the appropriate image section corresponding to the display device.

5. The method as claimed in claim 1 wherein the steps of capturing and scaling are performed by a master device on each appropriate image section.

6. The method as claimed in claim 5 further comprising the step of encoding each scaled image section into an encoded data stream representing the scaled image section.

7. The method as claimed in claim 6 wherein the step of encoding includes updating a display time value within the encoded data stream.

8. The method as claimed in claim 7 further comprising the step of transmitting the encoded data stream in a format across a high speed serial interface.

9. The method as claimed in claim 8 wherein the format is a selective one of an MPEG format and Digital Video format and the high speed serial interface is an IEEE 1394 serial bus network.

10. The method as claimed in claim 9 wherein the encoded data stream for each display device is transmitted over a separate isochronous channel.

11. The method as claimed in claim 6 further comprising the step of transmitting each encoded data stream to each appropriate display device.

12. The method as claimed in claim 11 wherein the step of transmitting includes combining data representing the scaled image section for an appropriate display device in a stream of data packets, each including an address value corresponding to a memory location within the appropriate display device.

13. A method of displaying images on a multiple display configuration including a plurality of display devices comprising the steps of:
    a. determining capabilities and characteristics of the display devices;
    b. partitioning an image into a plurality of image sections each corresponding to a display device within the multiple display configuration;
    c. assigning each image section to a corresponding display device;
    d. capturing each image section corresponding to each display device from an original data stream;
    e. scaling each image section for each display device thereby forming scaled image sections corresponding to each display device;
    f. displaying the corresponding scaled image sections at each display device at an appropriate time thereby forming a magnified image across the multiple display configuration representing the image;
    g. encoding each scaled image section into an encoded data stream representing the scaled image section;
    h. transmitting each encoded data stream to each appropriate display device, wherein the step of transmitting each encoded data stream includes combining data representing the scaled image section for an appropriate display device in a stream of data packets, each including an address value corresponding to a memory location within the appropriate display device; and
    i. transmitting a trigger packet on occurrence of a trigger event, the trigger packet including a trigger address value corresponding to a trigger memory location within the appropriate display device;

wherein the steps of capturing and scaling are performed by a master device on each appropriate image section.

14. The method as claimed in claim 13 wherein the trigger packet includes a trigger bit, which when written into the trigger memory location, signals that storage of a current scaled image section for display by the appropriate display device is complete.

15. The method as claimed in claim 14 wherein the data packets are isochronous packets.

16. The method as claimed in claim 13 wherein the trigger packet further includes a presentation time value specifying a display time of the scaled image section.

17. The method as claimed in claim 1 further comprising the step of transmitting the original data stream to each appropriate display device over a high speed serial interface.

18. The method as claimed in claim 17 wherein the high speed serial interface is an IEEE 1394 serial bus network.

19. The method as claimed in claim 1 wherein the original data stream includes a selective one or more of video, graphics and text.

20. A method of transmitting images to display devices within a multiple display configuration comprising the steps of:
    a. logically partitioning an image into a plurality of image sections each corresponding to a display device within the multiple display configuration;
    b. instructing each display device to physically partition and capture an appropriate image section corresponding to the display device from an original data stream;
    c. transmitting the original data stream to each display device;

d. determining a latency value for each of the display devices;

e. determining a worst case latency value for the display devices; and f. communicating the worst case latency value to each of the display devices.

21. The method as claimed in claim 20 further comprising the steps of:

a. determining display dimensions of the multiple display configuration;

b. determining image dimensions of the image; and c. calculating a size of each image section.

22. The method as claimed in claim 20 further comprising the step of instructing each display device to display its appropriate image section at an appropriate time.

23. The method as claimed in claim 22 wherein the appropriate time is based on the worst case latency.

24. The method as claimed in claim 20 wherein the step of transmitting is completed over a high speed serial interface.

25. The method as claimed in claim 24 wherein the high speed serial interface is an IEEE 1394 serial bus network.

26. The method as claimed in claim 20 wherein the original data stream includes a selective one or more of video, graphics and text.

27. A method of displaying images on a multiple display configuration including a plurality of display devices and a master device comprising the steps of:

a. partitioning an image into a plurality of image sections each corresponding to a display device within the multiple display configuration;

b. assigning each image section to a corresponding display device:

c. capturing each image section corresponding to each display device from an original data stream at the master device;

d. scaling each image section for each display device thereby forming scaled image sections corresponding to each display device at the master device;

e. transmitting each scaled image section to each appropriate display device, wherein the step of transmitting each scaled image section includes combining data representing the scaled image section for an appropriate display device in a stream of data packets, each including an address value corresponding to a memory location within the appropriate display device;

f. displaying the corresponding scaled image sections at each display device at an appropriate time thereby forming a magnified image across the multiple display configuration representing the image; and g. transmitting a trigger packet on occurrence of a trigger event, the trigger packet including a trigger address value corresponding to a trigger memory location within the appropriate display device.

28. The method as claimed in claim 27 further comprising the step of encoding each scaled image section into an encoded data stream representing the scaled image section, before the step of transmitting is completed.

29. The method as claimed in claim 28 wherein the step of encoding includes updating a display time value within the encoded data stream.

30. The method as claimed in claim 29 wherein the step of transmitting includes transmitting the encoded data stream in a selective one of an MPEG format and DV format across an IEEE 1394 serial bus network.

31. The method as claimed in claim 27 wherein the trigger packet includes a trigger bit, which when written into the trigger memory location signals that storage of a current scaled image section for display by the appropriate display device is complete.

32. The method as claimed in claim 31 wherein the data packets are isochronous packets.

33. The method as claimed in claim 27 wherein the trigger packet further includes a presentation time value specifying a display time of the scaled image section.

34. The method as claimed in claim 27 wherein the step of transmitting is performed over a high speed serial interface.

35. The method as claimed in claim 34 wherein the high speed serial interface is an IEEE 1394 serial bus network.

36. The method as claimed in claim 27 further comprising the steps of:

a. determining display dimensions of the multiple display configuration;

b. determining image dimensions of the image; and c. calculating a size of each image section.

37. The method as claimed in claim 27 wherein the corresponding scaled image section represents a full screen of data for the display device.

38. The method as claimed in claim 27 wherein the original data stream includes a selective one or more of video, graphics and text.

39. A multiple display configuration system comprising:

a. a plurality of display devices each comprising:

i. a display communications circuit configured for receiving and transmitting data;

ii. a capturing circuit coupled to the display communications circuit for capturing an image section assigned to the display for each image within an original data stream;

iii. a scaling circuit coupled to the capturing circuit for scaling each captured image section thereby forming a scaled image section; and iv. a display circuit coupled to the scaling circuit for displaying the scaled image section; and b. a master device coupled to the plurality of display devices comprising:

i. a master communications circuit configured for receiving and transmitting data; and ii. a control circuit coupled to the master communications circuit for partitioning an image into a plurality of image sections each corresponding to one of the display devices and assigning each image section to a corresponding display device.

40. The multiple display configuration as claimed in claim 39 further comprising a video source coupled to the display devices and to the master device for providing a video stream as the original data stream to be displayed on the display devices.

41. The multiple display configuration as claimed in claim 39 wherein the display circuit displays the scaled image section at an appropriate time specified by the master device.

42. The multiple display configuration as claimed in claim 39 wherein the scaled image section represents a full screen of data for the display device.

43. The multiple display configuration as claimed in claim 39 wherein the display devices and the master device are all coupled together by a high speed serial interface.

44. The multiple display configuration as claimed in claim 43 wherein the high speed serial interface is an IEEE 1394 serial bus network.

45. The multiple display configuration as claimed in claim 39 wherein the original data stream includes a selective one or more of video, graphics and text.

* * * * *

UNITED STATES PATENT AND TRADEMARK OFFICE
CERTIFICATE OF CORRECTION

PATENT NO. : 6,501,441 B1
DATED : December 31, 2002
INVENTOR(S) : Harold Aaron Ludtke et al.

It is certified that error appears in the above-identified patent and that said Letters Patent is hereby corrected as shown below:

Column 20,
Line 5, please replace "stream spec" with -- stream_spec --.

Column 25,
Line 67, please insert a comma after the word "location".

Signed and Sealed this

Thirty-first Day of August, 2004

JON W. DUDAS
*Director of the United States Patent and Trademark Office*